Aug. 15, 1939.    E. MAY    2,169,567
GENEVA MOVEMENT FOR MOTION PICTURE PROJECTION
Filed March 15, 1938
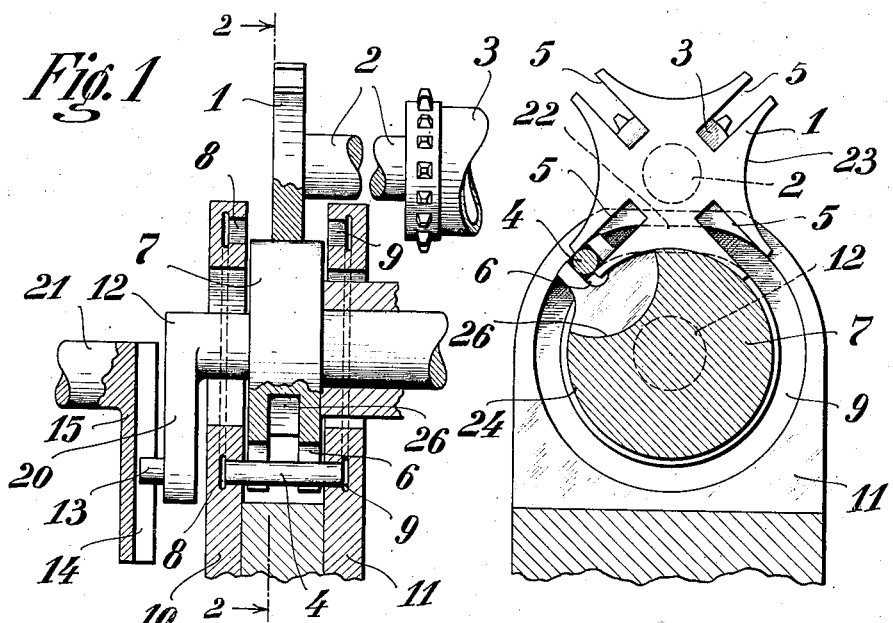
Fig. 1
Fig. 2
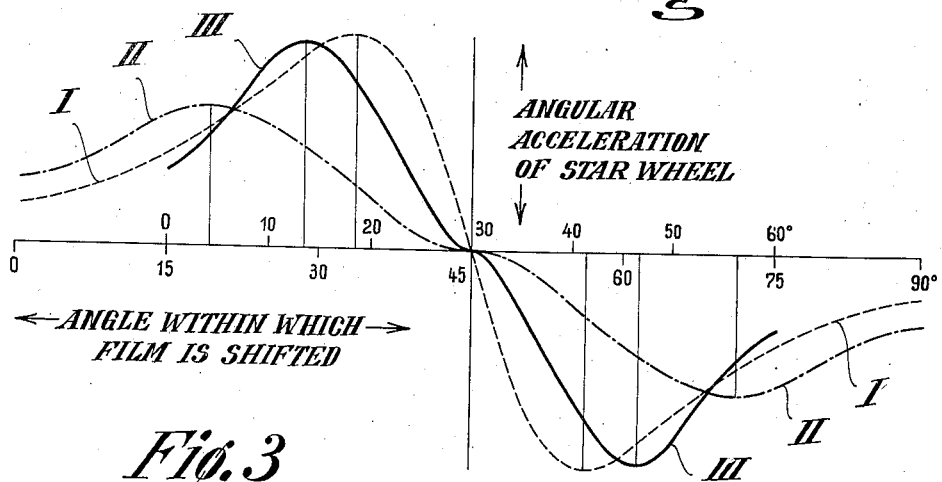
ANGULAR ACCELERATION OF STAR WHEEL
←ANGLE WITHIN WHICH→
FILM IS SHIFTED
Fig. 3
INVENTOR
Erwin May
BY
ATTORNEY Patented Aug. 15, 1939

2,169,567

UNITED STATES PATENT OFFICE 2,169,567

GENEVA MOVEMENT FOR MOTION PICTURE PROJECTION

Erwin May, Wetzlar, Germany, assignor to Ernst Leitz, G. m. b. H., Wetzlar, Germany Application March 15, 1938, Serial No. 195,982
In Germany March 30, 1937

1 Claim. (Cl. 74—436)

The object of this invention is to provide a Geneva movement for motion picture projection comprising a combination of elements whereby to obtain a relatively high rotative speed of the star wheel for shifting the film coupled with a relatively low angular acceleration whereby to prolong the projection periods without subjecting the film to excessive or destructive stresses.

The invention is embodied in a Geneva movement having a star wheel with four slots which are successively engaged by the pin in the pin wheel. The pin is radially movable in the pin wheel whereby to obtain a relatively low acceleration of the star wheel when the film is shifted. The pin wheel itself is eccentrically driven whereby to obtain a relatively high rotative speed of the star wheel for shifting the film whereby to shorten the periods during which the film is shifted and lengthen the projection periods.

The advantage of such a movement is prolonged projection periods without subjecting the film to excessive or destructive tension. The invention will be more fully explained and understood from the following description read together with the accompanying drawing in which Fig. 1 is a view in elevation of a Geneva movement embodying the invention with parts in section and parts broken away.

Fig. 2 is a sectional view on the line 2—2 in Fig. 1, but showing the driving pin about to enter a slot in the star wheel.

Fig. 3 is an explanatory curve diagram.

Referring to Figs. 1 and 2 the reference numeral 3 denotes the film transport roller of a projection apparatus, details of which are omitted. The roller is fast on the star wheel shaft 2 which carries the star wheel 1 provided with the usual slots 5 which are engaged successively by the pin 4 in the pin wheel 7 fast on the driving shaft 12. The pin 4 moves in cam grooves 8 and 9 in fixed bearings 10 and 11, the ends of the pin extending into the grooves as seen in Fig. 1. The grooves are circular except the upper portions thereof which are flattened as indicated at 22. The pin wheel is provided with a fork 6 for moving the pin.

When the shaft 12 is actuated the pin wheel 7 with the pin 4 will be rotated and when the pin enters a slot 5 in the star wheel to rotate the latter, the pin will move radially inward in the pin wheel as the pin travels in the flattened portions 22 of the grooves 8 and 9. When the pin 4 passes out of engagement with a slot 5, the stop portions 23 in the star wheel are engaged by the circular surface 24 of the pin wheel 7 in the usual manner to keep the star wheel stationary while the picture is being projected. The pin wheel 7 is cut out as at 26 to permit the arms of the star wheel to pass.

The shaft 12 is provided with a crank 20 which carries a pin 13. The latter is engaged by the groove 14 in a crank arm 15 fast on a driving shaft 21. The latter is eccentrically mounted relative to the shaft 12 by any suitable means, not shown. When the shaft 21 s actuated, the shaft 12 is rotated at a speed which is lowest when the crankpin 13 is in the position shown in Fig. 1 and which is highest when the crankpin 13 is in the diametrically opposite position, the pin then being farthest away from the center of the shaft 21 and then of course the speed again decreases during the second half of the rotation.

The advantages of a Geneva movement embodying this invention are illustrated in Fig. 3 which is a diagram of curves representing the angular acceleration of the star wheel in three different types of Geneva movements for the sake of comparison. Curve I shows the angular acceleration in a standard Geneva movement, i. e, a movement in which the pin is not capable of radial movement and the pin wheel shaft is not actuated eccentrically. Curve II shows the acceleration if a standard Geneva movement is provided with the radially movable pin, and curve III illustrates the angular acceleration with the Geneva movement disclosed herein.

A comparison of the three curves and their ordinates shows clearly the advantages of this invention in that the acceleration in curve III is no greater than in curve I, hence the acceleration is relatively low and has not been increased over that of a standard movement. On the other hand the rotative speed of the star wheel has been increased about one third over that of the standard movement or in other words the time period within which the film is shifted is shortened by one third. Such decrease in the time required to shift the film could not be included in the operation of a Geneva movement exclusive of the radially movable pin without subjecting the film to destructive stresses. The curves demonstrate that a Geneva movement according to this invention results in lengthened projection periods without subjecting the film to abnormal stresses.

I claim:

A Geneva movement for motion picture projection comprising two fixed spaced plates having opposed symmetrical cam grooves, a pin extending between said plates to move in said cam grooves, a drive shaft extending through said plates, a pin wheel mounted on said drive shaft in the space between said plates, means in the pin wheel engaging said pin to rotate the same in the said cam grooves, a star wheel in cooperative relation with the said pin and pin wheel, said cam grooves including flattened portions for guiding said pin radially in the pin wheel when the pin engages the star wheel, a driving shaft in eccentric relation to the drive shaft and cooperating means on the said two shafts for driving the drive shaft at a speed which is accelerated as the pin is moved towards the star wheel.

ERWIN MAY.